April 24, 1934.　　　G. S. ROGERS ET AL　　　1,956,178
HAND OPERATED METERED FLUID PUMP
Filed April 29, 1931　　3 Sheets-Sheet 3

INVENTORS
Gerald S. Rogers &
William H. Johnson
by their attorneys
Byrnes, Stebbins, Parmelee & Blenko

UNITED STATES PATENT OFFICE 1,956,178

HAND OPERATED METERED FLUID PUMP

Gerald S. Rogers, Etna, and William H. Johnson, Greensburg, Pa., assignors to Universal Lubricating Systems, Inc., Etna, Pa., a corporation of Delaware Application April 29, 1931, Serial No. 533,636

12 Claims. (Cl. 221—103)

Our invention relates generally to fluid dispensing devices and, more particularly, to a portable, hand-operated, metered fluid dispenser adapted for handling fluids of all classes.

Fluid dispensing devices, as heretofore constructed, have been characterized by numerous defects and objectionable features. As far as we are aware, all the metered dispensing devices which have been known heretofore were lacking in the accuracy now required in many jurisdictions by State law. The use of rotary meters in dispensing devices has been attempted but they have been found inaccurate. Such meters, furthermore, were not proof against false operation, either accidentally or intentionally, by the attendant in charge thereof. In many cases, therefore, the purchaser of fluid failed to receive the amount for which he paid. Another defect of present types of metered dispensers lies in the fact that they may continue to operate when the level of liquid available for dispensing has fallen below the intake of the dispenser. This permits the meter to register, although less than the normal amount of fluid is being delivered.

To our knowledge, there has not been known heretofore any metered dispenser which absolutely prevented the "milking" of the device, that is to say, the partial operation of the dispenser between the limits of its movement to cause the dispensing of fluid without operation of the meter.

In order to overcome these objections to the devices of the prior art, we have invented a metered dispenser in which accuracy of measurement is ensured by utilizing the travel of a piston in a cylinder as the measuring standard. As a protection to the customer, we provide that the meter does not register until the piston's stroke has been substantially completed. It is thus impossible for a customer to be charged for a full unit of measurement unless it has been entirely delivered. Our invention includes means for positively preventing further operation of the dispenser, as soon as the level of the liquid in the supply falls below a predetermined point. We provide means which absolutely prevents "milking" or partial reciprocation of the piston, without actuation of the meter. We also provide a resetting device for the meter which positively prevents unauthorized advancement thereof, without affecting the ease of resetting.

In accordance with our invention, we utilize a reservoir or "bucket" for holding the liquid to be dispensed. On the cover of the reservoir, we mount a cylinder having a valved piston therein. The lower end of the cylinder is also valved. Operating means for the piston comprises a housing supported above the bucket cover. A pinion on a manually operable crank shaft engages a rack connected to the piston for reciprocating the latter. A reversible yoke having pawls thereon is yieldably retained in one of two alternative positions to prevent reversal of the piston before reaching the end of its stroke. Pins carried by the rack shift the yoke at the ends of the piston travel. An annular float surrounds the cylinder and is reciprocable thereon to actuate locking means engaging the pinion or the rack when the fluid level falls.

A meter is mounted on top of the housing and comprises a plunger adapted to be engaged by the piston at substantially the end of its stroke. The plunger operates a ratchet mechanism for turning a pointer relative to a calibrated dial. The pointer may be reset by means of a knob having a ratchet drive connecting it to the pointer. Provision is made for totalizing the number of dispensing operations on a counter adapted to be actuated by the meter operating mechanism.

For a more complete understanding of the invention, reference is made to the accompanying drawings, in which Figure 1 is an elevational view of a present preferred embodiment of our invention;

Figure 8 is a partial sectional view similar to Figure 2 showing a modified form of parts of the invention.

Figure 1:
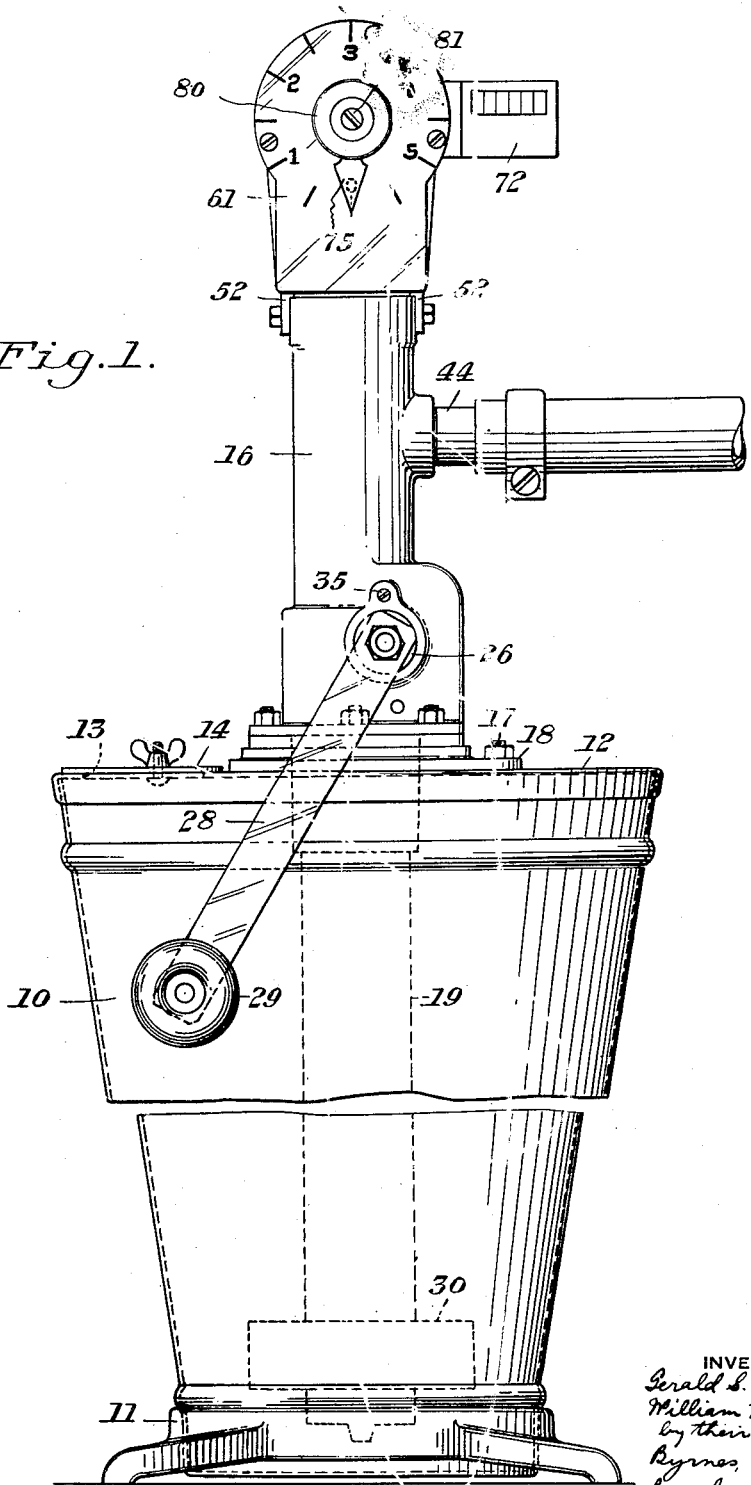

Referring now in detail to the drawings, a sheet metal bucket or reservoir 10 is provided with a base casting 11 and a cover 12. A filling opening 13 for the bucket has a cover 14. An opening 15 substantially centrally of the cover 12 admits the lower end of a housing 16 secured to the cover by bolts 17 passing through a flange 18 integral with the housing. The lower end of the housing is provided with a cylinder 19 which has threaded engagement therewith.

In the bottom of the cylinder 19, a valve seat 20 is threaded and is provided with a valve disc 21 seated thereon. Within the cylinder 19 a piston 22 is reciprocable and is connected to a piston rod 23. The piston 22 has a central opening therein and provides a seat for a valve disc 24 similar to the valve disc 21 of the valve 20.

The piston rod 23 carries a rack bar 25. A shaft 26 is journalled transversely in the housing 16 and is provided with an elongated pinion 27 meshing with the rack bar 25. A crank arm 28 having a knob 29 is secured to the shaft 26.

An annular float 30 surrounds the cylinder 19 and is adapted to reciprocate on the latter as a guide. A rod 31 extends upwardly from the float 30 and has a pivotal connection to a bell crank 32 pivoted within the housing 16. The crank 32 is provided with a locking pawl 33 adapted to engage the teeth of the pinion 27 when the float 30 descends below a predetermined level in the bucket 10, to prevent further operation of the dispenser.

A yoke 34 is pivoted within the housing 16 on a pin 35. The yoke 34 has pawls 36 and 37 at its ends and, adjacent its pivotal bearing, is provided with beveled faces 38 and 39. Adjacent the pawl 36, the yoke 34 has a finger 40. Pins 41 and 42 carried by the rack bar 25 are adapted to engage the finger 40 to shift the yoke 34 as the piston 22 approaches the ends of its stroke. A spring pressed plunger 43 mounted in a suitable recess in the housing 16 serves to engage one or the other of the beveled faces 38 and 39 of the yoke 34, in order to bias the yoke into one of its alternative positions. The pawls 36 and 37 are shaped to permit rotation of the pinion 27 in one direction, while preventing rotation in the reverse direction. As the pinion 27 is rotated, the pawl in engagement with the teeth thereof clicks over the teeth and the yoke oscillates on its bearing pin 35, but the plunger 43 prevents the pawl from swinging clear of the pinion teeth. The engagement of the pins 41, 42 with the finger 40, however, shifts the yoke past its neutral point and shifts the yoke to present the other pawl to the teeth of the pinion.

The housing 16 is provided with a discharge port 44 adjacent its upper end. A partition 45 extends around the port 44 and upwardly almost to the top of the housing 16. This partition maintains the proper level of fluid in the housing 16 at all times when the dispenser is in condition for operation.

The top of the housing 16 is closed by a disc 46 threaded thereinto. The disc 46 is provided with a packing gland 47, through which passes a plunger 48. The plunger 48 is provided with a head 49 adapted to be engaged by the upper end of the piston rod 23 or the rack bar 25, when the piston 22 has reached the upper limit of its movement. The plunger rod 48 is normally depressed by a depression spring 50.

A meter housing 51 is supported from the housing 16 on legs 52. Within the housing 51 a link 53 is pivoted at 54 and carries a pawl 55 adapted to engage the teeth of a ratchet wheel 56. A spring 57 holds the pawl into engagement with the teeth of the ratchet wheel. The upper end of the plunger 48 has a fork 58 which is pinned to the link 53. The ratchet wheel 56 is mounted on a drum 59 having a trunnion 60 journalled in the rear wall of the housing 51. A dial plate 61 covers the open face of the housing 51 and provides an additional bearing for the drum 59 which has a reduced bearing portion 62 and a shaft extension 63.

A spring pressed detent 64 is pivoted within the housing at 65 and is adapted to engage the teeth of the ratchet wheel 56 to prevent reverse movement thereof. A link 66 has a notched end 67 adapted to engage a pin 68 in the end of the detent 64. A spring 69 maintains the link 66 in engagement with the pin 68. The function of the link 66 is to raise the detent 64 from between the teeth of the ratchet wheel 56 when the latter is about to be advanced by the pawl 55. The link 66 is also provided with a pin 70. This pin serves to operate an actuating lever 71 of a counter 72, which extends through an opening in the wall of the housing 51. Alternatively, the opening in the wall of the housing 51 may be closed by a plate 73. The counter 72 serves as a totalizer to record the number of metering operations effected by the dispenser.

Figure 2:
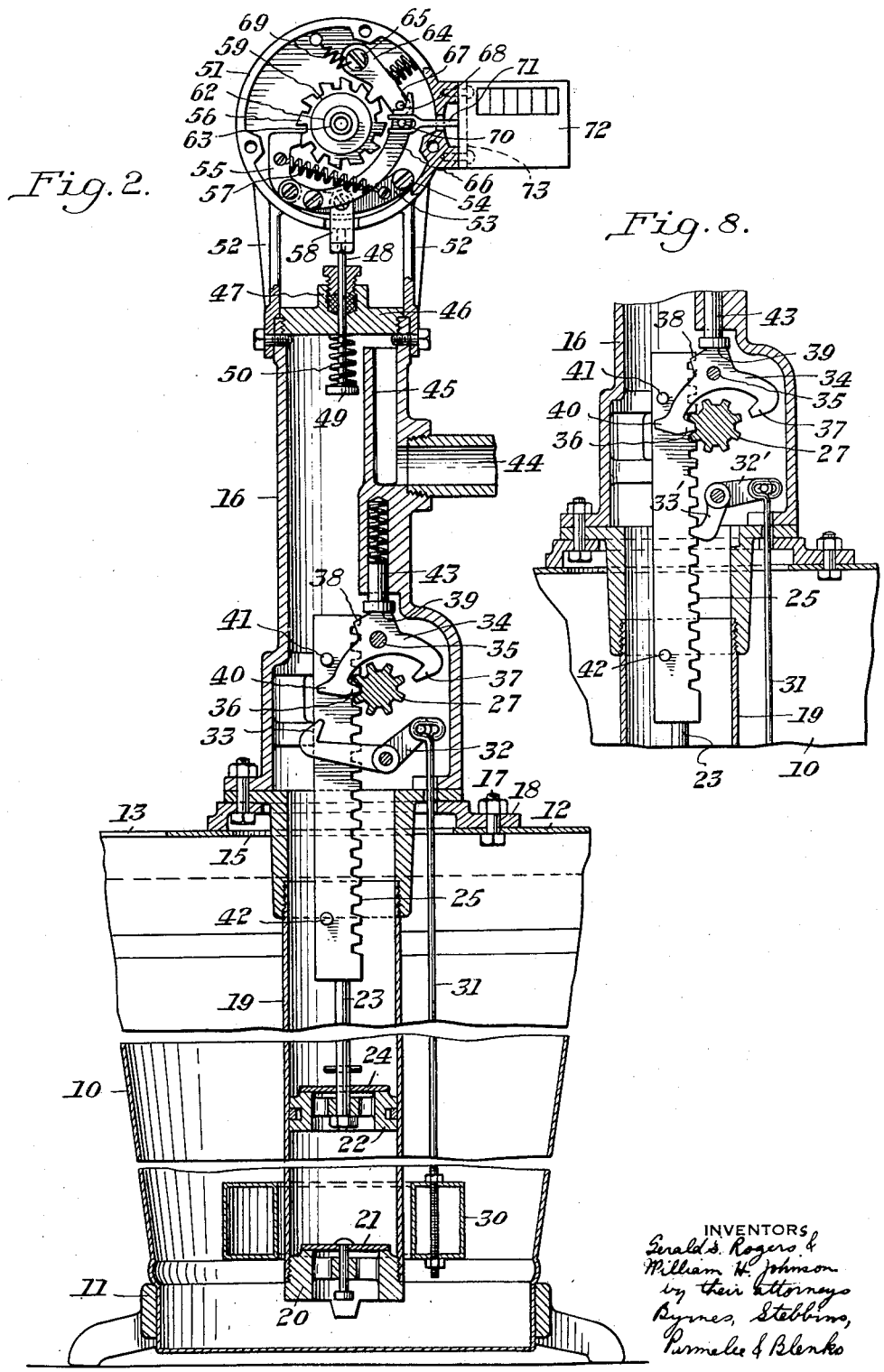
Figure 2 is a central transverse sectional view of the device shown in Figure 1, with parts being shown in elevation.

The shaft extension 63 carries a barrel 74 provided with a pointer 75. Spring pressed pins 76 and 77 are disposed in axial recesses in the barrel 74. The pin 76 is adapted to engage a ratchet cam 78 on the dial 61 to determine the initial position of the pointer 75. The barrel 74 is connected to the shaft extension 63 by means of a so-called "Safe Cracker's Ratchet" 79. This device consists of a spring coiled about the shaft 63 and having one end inserted in a radial hole in the latter. The coiled spring fits within a bore in the barrel 74 and is wound on the shaft 63 in such direction, that when the latter is rotated in a clockwise direction, as viewed in Figure 2, the coiled spring 79 will expand slightly and grip the interior of the bore in the barrel 74. The coiled spring 79 thus constitutes a frictional drive for the pointer 75, which is effective only in one direction. It does not prevent resetting of the pointer 75, since if the barrel 74 is turned in a counter-clockwise direction, it will tend to contract the spring 79 and permit relative rotation of the barrel on the shaft 63.

Figure 3:
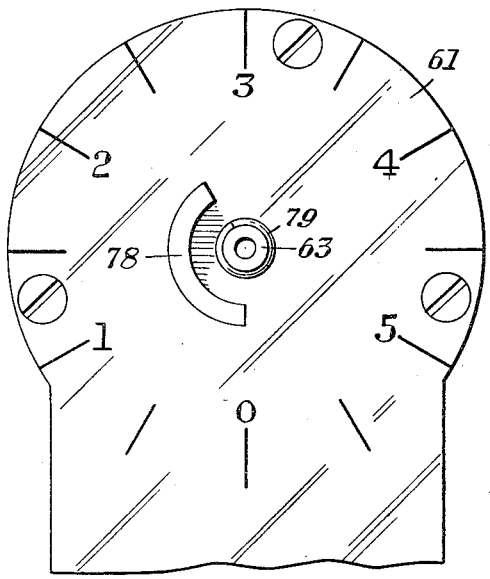
Figure 3 is a face view of the meter dial with the pointer removed.
Figure 4:
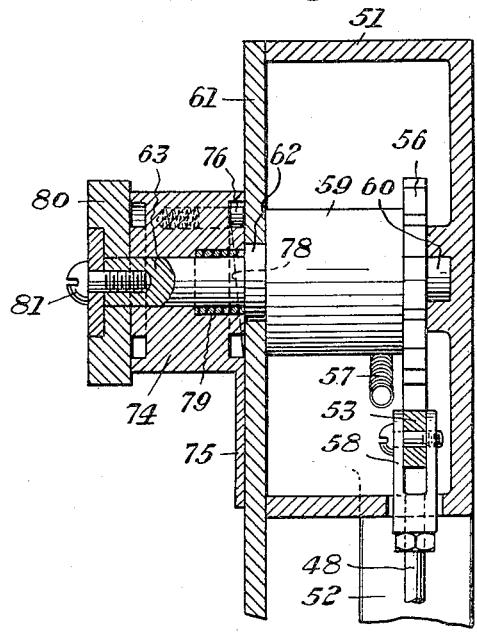
Figure 4 is a sectional view through the meter on the line IV—IV of Figure 3.
Figure 5:
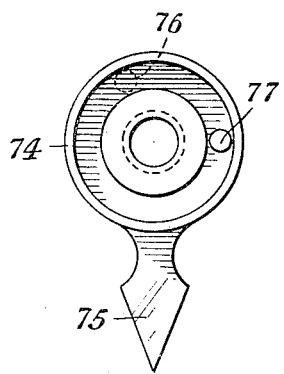
Figure 5 is a top view of the meter pointer.
Figure 6:
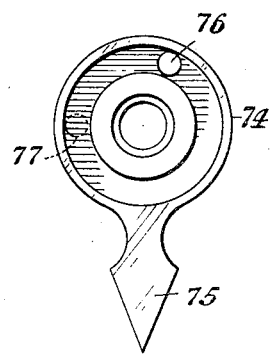
Figure 6 is a bottom view of the meter pointer.
Figure 7:
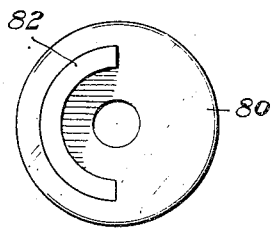
Figure 7 is a bottom view of the resetting knob.

For resetting the pointer 75, we provide a knurled knob 80 loosely mounted on the end of the shaft 63 by a screw 81. The knob 80 is provided on its lower face with a ratchet cam 82, similar to that shown on the meter dial 61 at 78. These cams are merely arcuate inclined planes and, as shown in Figures 3 and 7, their upper ends are the high ends and they taper down gradually to the level of the dial and the knob, respectively. The high end of the cam 82 is engaged by the pin 77 when the knob 80 is reversed to reset the pointer 75. It will be apparent that clockwise movement of the knob 80 will not cause forward movement of the pointer 75, since the latter is locked tightly to the shaft 63 by the spring 79. The initial position of the pointer 75 is determined by the engagement of the pin 76 with the high end of the cam 78.

The operation of the device is as follows, assuming the bucket 10 to be full of the fluid to be dispensed and the pointer 75 to be in the position shown in Figure 1. A hose or delivery tube 83 may be attached to the port 44 for discharging the fluid dispensed into the desired receptacle. Assuming that the initial position of the piston 22 is that shown in Figure 2, and that the housing 16 is filled with fluid up to the level of the top of the partition 45, rotation of the crank 28 in a clockwise direction will raise the piston 22 to cause the discharge of fluid from the port 44 and the hose 83. The valve disc 24 seats firmly on the piston 22 as the upward movement of the latter begins. As the pinion 27 turns clockwise, the pawl 36 of the yoke 34 clicks over the pinion teeth. The shape of the pawl 36 is such that reversal of the rotation of the shaft 26 is prevented. The plunger 43 maintains the yoke 34 in proper position for preventing downward movement of the piston until the pin 42 on the rack bar engages the finger 40 on the yoke 34. The yoke 34 is thereby swung past its neutral position, so that the pawl 37 engages the teeth of the pinion 27. This pawl is designed to permit counter-clockwise motion of the pinion, while preventing clockwise motion thereof.

As the piston 22 reaches the end of its upward stroke, the head 49 on the plunger 48 is engaged by the upper end of the rack bar 25 and the link 53 in the housing 51 is swung about its pivot 54 by its pin connection to the forked upper end of the plunger 48. Angular movement of the link 43 causes the pawl 55 to engage a tooth of the ratchet wheel 56 to advance the latter. Before the ratchet wheel is advanced, however, the link 66 raises the detent 64 to permit such advance movement of the ratchet wheel. The movement of the link 66 also operates the counter 72 to register another operation of the dispenser.

The rotation of the ratchet wheel 56 turns the drum 59 in the meter housing 51 and the shaft 63 through the spring ratchet 79 drives the pointer 75 over its calibrated dial in a clockwise direction.

On reversing the pinion 27, the piston 22 is lowered and its valve disc 24 is raised to permit the flow of fluid through the piston. On the upward movement of the piston, the valve disc 21 leaves its seat to permit the space in the cylinder 19, below the piston, to fill with fluid. On the downward stroke of the piston, the valve disc 21 seats on the valve 20 and the fluid trapped in the lower end of the cylinder passes through the piston 22. As the piston approaches the lower limit of its movement, the pin 41 engages the finger 40 to restore the yoke 34 to the position illustrated in Figure 2. The restoration of the yoke 34 permits the second reversal of the pinion 27 to raise the piston 22 again. The previously described cycle may thus be repeated as frequently as desired to supply the required amount of fluid. It will be apparent that as the liquid level in the bucket 10 drops to a predetermined level, the float 30 will fall and swing the bell crank 32 so that its pawl 33 engages the teeth of the pinion 27 to prevent further movement thereof until the supply of fluid in the bucket is replenished.

When the desired amount of fluid has been dispensed, the pointer 75 should be reset to zero. This is done by turning the knob 80 in a counter-clockwise direction. In so doing, the high end of the cam 82 engages the pin 77 in the barrel 74 to return the pointer to zero. The zero position of the pointer 75 is determined, as previously stated, by the engagement of the pin 76 with the high end of the cam 78. The reverse movement of the barrel 74 is permitted by the contraction of the spring 79, as already explained. It will be apparent that it is thus impossible for the pointer 75 to be advanced manually, either by attempting to turn the barrel 74 or the knob 80. If the barrel 74 is turned clockwise, the spring 79 will expand and lock the barrel to the shaft 63. If the knob 80 is turned clockwise, the pin 77 will be forced into the barrel 74 as the high point of the cam 82 approaches it. The pin 77 and cam 82 thus form a type of ratchet connection, whereby the knob 80 may be turned in a clockwise direction, but does not cause rotation of the barrel 74 until it is turned in a counter-clockwise direction. The same is true of the ratchet spring 79 connecting the shaft 63 and the barrel 74. The spring 79, of course, instead of being secured to the shaft 63 and adapted to frictionally engage the bore in the barrel 74, might just as well be pinned to the barrel and adapted for frictional engagement with the shaft 63.

A modified form of the float actuated pinion locking mechanism is shown in Figure 8. According to this modification, the float rod 31 operates a bell crank 32' having a pawl 33' adapted to engage the teeth of the rack bar 25, instead of the teeth of the pinion 27, as in the case of the first described form of the invention.

It will be apparent from the foregoing that we have provided a metered dispensing device which takes advantage of the known accuracy of measurement by piston displacement. We further increase the accuracy of dispensing by providing that the dispensing cylinder be filled to a predetermined level at all times, so that there is no possibility of failure to deliver the desired amount of fluid, as a result of each piston operation. We have also provided a meter which is advanced step by step as the dispensing movement of the piston are successively completed. Partial piston movements will not actuate the meter.

The float operated piston lock insures that operation of the meter will be prevented as soon as the fluid level in the bucket reaches a dangerously low point. The shiftable yoke provided with double pawls prevents reversal of the piston during movement in either direction, and thus prevents the machine from being "milked". The reversal of the piston after it reaches the ends of its movement is, nevertheless, made possible by the automatic shifting of the yoke.

The meter we have provided can easily be reset, as above described, but it cannot be manually advanced or otherwise tampered with to produce a false indication.

The foregoing characteristics and advantages of our invention have enabled the device to pass the rigid tests established by the various State Departments of Weights and Measures, and as far as we know, our device is the only one which has thus far been so certified.

While we have described but a single present preferred embodiment of our invention, with a partial modification thereof, the invention may obviously be embodied in forms and designs other than that shown and described herein. The device, for example, can be made in practically any desired size and calibrated accordingly. Any such changes, of course, may be made without departing from the spirit of the invention as set forth in the appended claims.

We claim:

1. In a fluid dispensing device, the combination with a reservoir, and a pump cylinder therein having a reciprocable piston, of means for reciprocating said piston to dispense fluid, and a float in said reservoir slideable on said cylinder as a guide, and means actuated by the float for controlling movement of the piston.

2. In a fluid dispensing device, the combination with a reservoir, and a pump cylinder therein having a reciprocable piston, of means for reciprocating said piston to dispense fluid, and an annular float in said reservoir surrounding said cylinder and reciprocably guided thereby, and means actuated by the float for preventing further movement of the piston on lowering of the fluid level in the reservoir to a predetermined point.

3. In a fluid dispensing device, the combination with a reservoir, and a pump cylinder therein having a reciprocable piston, of means for reciprocating said piston to dispense fluid, a meter operated by the piston at the end of its stroke, means for manually resetting said meter to zero, and means preventing manual advancement of the meter.

4. In a fluid dispensing device, the combination with a reservoir, and a pump cylinder therein having a reciprocable piston, of means for reciprocating said piston to dispense fluid, including a rack bar connected to the piston and a pinion for actuating the rack bar, a float in said reservoir, and means actuated thereby for engaging said rack bar to prevent movement thereof.

5. In a fluid dispensing device, the combination with a reservoir, and a pump cylinder therein having a reciprocable piston, of means for reciprocating said piston to dispense fluid, including a rack bar connected to the piston and a pinion for actuating the rack bar, a float in said reservoir, and means actuated thereby for engaging said pinion to prevent movement of said piston.

6. In a fluid dispensing device, the combination with a reservoir, and a pump cylinder therein having a reciprocable piston, of means for reciprocating said piston to dispense fluid, a meter mounted on the cylinder, and means for operating said meter including a plunger in the path of the piston-reciprocating means, a ratchet mechanism actuated by the plunger for advancing the meter on the completion of a piston stroke, and a retractible detent engaging the ratchet mechanism for normally preventing operation of the ratchet mechanism.

7. In a fluid dispensing device, the combination with a reservoir, and a pump-cylinder therein having a reciprocable piston, of means for reciprocating said piston to dispense fluid, a meter mounted on the cylinder, and means for operating said meter including a plunger in the path of the piston-reciprocating means, a ratchet mechanism actuated by the plunger for advancing the meter on the completion of a piston stroke, means for normally preventing operation of the ratchet mechanism, and means operated by the plunger for rendering said operation-preventing means ineffective.

8. In a fluid dispensing device, the combination with a reservoir, and a pump cylinder therein having a reciprocable piston, of means for reciprocating said piston to dispense fluid, including a rack bar connected to the piston and a pinion for actuating the rack bar, a double pawl pivotally mounted having beveled faces, a spring pressed plunger for engaging one of said faces to resiliently bias the pawl into engagement with the pinion to prevent rotation thereof in a selected direction.

9. In a fluid dispensing device, the combination with a reservoir, and a pump cylinder therein having a reciprocable piston, of means including a rack and a reversible pinion for reciprocating said piston to dispense fluid, a meter operated by the piston at the end of its stroke, means engaging the pinion for preventing reversal of said piston before completing a full stroke in either direction, and means responsive to the fall of liquid level in the reservoir for preventing movement of the piston.

10. In a fluid dispensing device, the combination with a reservoir, and a pump cylinder therein having a reciprocable piston, of a rack and pinion for reciprocating said piston to dispense fluid, and means actuated by the fall of fluid level in the reservoir for engaging the piston-reciprocating pinion and preventing movement of said piston.

11. In a fluid dispensing device, the combination with a reservoir, and a pump cylinder therein having a reciprocable piston, of means including a rack and pinion for reciprocating said piston to dispense fluid, and a float in said reservoir and means actuated thereby for locking said rack and pinion, and therefore said piston, against movement.

12. In a fluid dispensing device, the combination with a reservoir, and a pump cylinder therein having a reciprocable piston, of means for reciprocating said piston to dispense fluid, a meter mounted on the cylinder, and means for operating said meter including a plunger in the path of the piston-reciprocating means, a ratchet mechanism actuated by the plunger for advancing the meter on the completion of a piston stroke, and means for normally preventing operation of the ratchet mechanism, said last-mentioned means being rendered ineffective on operation of the plunger.

GERALD S. ROGERS.
WILLIAM H. JOHNSON.